UNITED STATES PATENT OFFICE 2,689,799

CELLULOSE ESTER COMPOSITIONS PLASTICIZED WITH POLYESTERS OF DICARBOXYLIC ACIDS AND $\alpha,\omega$-DIHYDROXYALKANES Charles P. Albus and Richard E. Field, Easton, Pa., assignors to General Aniline & Film Corporation, New York, N. Y., a corporation of Delaware No Drawing. Application November 16, 1951, Serial No. 256,813

8 Claims. (Cl. 106—180)

This invention relates to cellulose esters and ethers and particularly to cellulose esters and ethers plasticized with dicarboxylic acid polyesters of 1,4-butanediol and of 1,6-hexanediol.

In the preparation of cellulose esters for various uses, it is common practice in the art to modify them by the addition of materials having a plasticizing or softening action. It is a necessary requisite of these plasticizers that they be compatible over a fairly wide range, have good stability, low volatility, good resistance to oxidation or migration on aging, be resistant to the leaching action of water, and must not develop objectionable odors on standing.

If a plasticizer is not completely compatible in the proportions generally used with a cellulose ester, it will immediately exude from a cast film or molded article to give an opaque appearance and oily feel. Sometimes this occurs only after the molded article or cast film is allowed to stand for some time. In either case, the cellulose ester reverts to its original hardness and brittleness.

Low boiling plasticizers evaporate slowly on standing at room temperature or at temperatures to which the cellulose ester is subjected either in preparation or use. As a result, the cast film or molded article again becomes brittle and may easily crack or break. Films, lacquers, and molded articles may be subjected to water in their use. If the plasticizer is water soluble to even a small extent, the plasticizer is leached out of the cellulose ester which then becomes hard and brittle. Other properties which may be desired of a plasticizer will depend on the end use of the cellulose ester or ether. Some plasticizers will impart resistance to flammability, cold, oils, greases, and weathering. For example, triphenyl phosphate is commonly used where fire resistance is desired. Some plasticizers discolor badly or oxidize to give off objectionable odors. No one plasticizer seems to be a cure-all for defects in use. This is probably the reason why several hundred plasticizers have been suggested. The majority of them, however, generally fail in one or more of the necessary and desired properties, such as compatibility, low volatility, and water-resistance.

It has been found that the foregoing objections are overcome by plasticizing a cellulose ester or ether composition with polyesters of 1,4-butanediol and polyesters of 1,6-hexanediol and aliphatic, aromatic, or cyclic dicarboxylic acids which may or may not be chain-ended with a monocarboxylic acid of 2 to 8 carbon atoms; mixtures of dicarboxylic acids which may or may not be chain-ended with a monocarboxylic acid of 2 to 8 carbon atoms; and mixtures of mono- and dicarboxylic acids which may or may not be chain-ended with a monocarboxylic acid of 2 to 8 carbon atoms. Such polyesters have molecular weights ranging from about 500 to about 3,000 as determined ebullioscopically in acetone, and range from liquids to pasty solids. They are more soluble in lacquer solvents and more readily incorporated into cellulose ester and ether compositions than polyesters having extremely high molecular weights. They are also more readily compatible with the various cellulose esters and ethers and do not exude or show migration of plasticizer on standing when used as plasticizers for cellulose esters and ethers. They impart outstanding flexibility, toughness, resistance to water, dimensional stability in water, etc., to cellulose esters and ethers. They are unaffected by ultraviolet light and do not become discolored on exposure to sunlight. They are stable to heat and do not volatilize from cellulose ester and ether compositions exposed to heat in manufacture or use. They are odorless and do not impart objectionable odors to cellulose ester or ether compositions.

1,4 - butanediol, $HOH_2C$—$CH_2$—$CH_2$—$CH_2OH$, and 1,6-hexanediol, $$HOH_2C\text{—}CH_2\text{—}CH_2\text{—}CH_2\text{—}CH_2\text{—}CH_2OH$$

are commercially available products. The former is prepared by catalytic hydrogenation of 2-butyn-1,4-diol which is obtained from the reaction of acetylene with formaldehyde and the latter is obtained from the dimerization of propargyl alcohol, yielding 2,4-hexadiyne-1,6-diol followed by catalytic hydrogenation.

The following are illustrative examples of saturated dicarboxylic acids having the general structure:

$$HOOC(CH_2)_nCOOH$$

wherein $n$ is a numeral greater than 1, which may be employed in esterifying 1,4-butanediol and 1,6-hexanediol:

Succinic
Glutaric
Adipic
Pimelic
Suberic
Azelaic
Sebacic

The following are examples of unsaturated dicarboxylic acids which may be employed in esterifying the 1,4-butanediol and the 1,6-hexanediol:

Maleic
Fumaric

Ether-dicarboxylic acids, such as the following, may also be employed:

Diglycolic
Dilactic
Dihydracrylic
γ,γ'-Oxydibutyric

The following are examples of cyclic saturated and unsaturated dicarboxylic acids:

Tetrahydrophthalic
Hexahydrophthalic
3,6-endomethylene-Δ⁴-tetrahydrophthalic
Camphoric In addition to the above, aromatic dicarboxylic acids, such as phthalic acid, and its substitution products, such as o-phthalylglycolic acid, may also be employed in the esterification reaction.

Instead of esterifying the 1,4-butanediol and the 1,6-hexanediol with a single dicarboxylic acid, either saturated or unsaturated, it is possible to obtain mixed polyesters by employing a mixture of two dicarboxylic acids, either saturated or unsaturated, or a mixture of mono- and dicarboxylic acids. Improved compatibility with cellulose ester and ether compositions results from the polyester plasticizer wherein a mixture of such acids is used in the esterification. For example, a polyester prepared from 1,4-butanediol and a single dicarboxylic acid anhydride such as phthalic anhydride having a molecular weight of 1800, as determined by the ebulliometric boiling point rise in acetone using a micro-adaption of the Menzie-Wright apparatus, was incompatible when used as a plasticizer for cellulose acetate of 58.4 to 59% combined acetic acid content. A similar polyester prepared from 1,4-butanediol and a mixture of equal parts of phthalic anhydride and adipic acid was found to be perfectly compatible with cellulose acetate of 58.4 to 59% combined acetic acid content even though the molecular weight of this polyester was 1900 as determined ebullioscopically.

A still further improvement in the polyester for use as a plasticizer results if monocarboxylic acids of 2 to 18 carbon atoms, such as acetic, butyric, 2-ethylhexanoic, benzoic, etc., are used to end the chain by esterifying the free hydroxyl group or groups which may be present on the ends of the polyester chain.

The polyesterification reaction consists of three steps, i. e., (1) initial esterification at atmospheric pressure, (2) heating in vacuo, and (3) chain-ending or acylation of end hydroxyl groups. It is carried out with an excess of a polymethylene glycol or a mixture of two polymethylene glycols, i. e., from 20 to 100% excess to insure complete esterification, in which at least 50 mole per cent is composed of polymethylene glycols of 4 and/or 6 carbon atoms. The dicarboxylic acid component may be a single dicarboxylic acid or a mixture of two different dicarboxylic acids. Furthermore, a monocarboxylic acid or a mixture of monocarboxylic acids may be incorporated in the initial esterification mixture, along with the dicarboxylic acid or mixture thereof; or a monocarboxylic acid may be added at an intermediate stage in the initial esterification prior to heating in vacuo; or, finally, the monocarboxylic acid may be added after the initial esterification and after heating in vacuo, in which case the monocarboxylic acid acts as an acylating agent by reacting with the residual free end hydroxyl groups of the polyester.

The polyesterification is conducted at a temperature from 100 to 250° C., preferably at about 130–220° C. for at least 2 hours, with provision of an inert atmosphere, such as dry, oxygen-free nitrogen, and any suitable means for the removal of water as it is formed. When an excess of diol is used to esterify a single dicarboxylic acid, the ester first formed is characterized by the following formula:

I $\qquad$ $HOR_1OOCR_2COOR_1OH$ wherein $R_1$ represents $(CH_2)_4$ or $(CH_2)_6$ which consist of the 1,4-butanediol and 1,6-hexanediol residues, respectively, i. e., minus the terminal hydroxy groups, $R_2$ represents an alkylene, arylene, cycloalkylene, or an oxydialkylene group of a dicarboxylic acid residue.

Further esterification will yield products having the following general formula:

II $$HO-[-R_1OOCR_2COO-]_n-R_1OH$$

wherein $R_1$ and $R_2$ have the same values as above, and $n$ represents a numeral ranging from 2 to 20.

When a mixture of dicarboxylic acids is employed in the esterification reaction with 1,4-butanediol or 1,6-hexanediol, the polyesters characterized by Formula II will contain mixed $R_2$ groups in the repeating unit which will depend upon the mole ratio of the acids employed, the completeness of the esterification, etc.

When a mixture of a mono- and dicarboxylic acid is employed the completed esterification with the 1,4-butanediol or 1,6-hexanediol results in the following ester:

III $$R_3-O-[-R_1-OOC-R_2-COO-]_n-R_1OH$$

IV $$R_3-O-[-R_1-OOC-R_2-COO-]_n-R_1OR_3$$

wherein $R_1$ and $R_2$ have the same values as above, and $R_3$ represents an acyl group of a monocarboxylic acid of 2 to 18 carbon atoms, and $n$ represents a numeral ranging from 2 to 20.

Polyesters characterized by Formulas II and III may be further treated with a monocarboxylic acid of 2 to 18 carbon atoms to end the chain by esterifying the free hydroxyl group or groups remaining on the polyester to give plasticizers for cellulose esters and ethers which will have greater water resistance and heat stability.

As pointed out above, polyesters may be formed by esterifying 1,4-butanediol or 1,6-hexanediol with individual dibasic acids, mixtures of dibasic acids, or a mixture of a dibasic acid and a monobasic acid. Minor proportions of a monocarboxylic acid may also be used to end the chain. For example, 1,4-butanediol or 1,6-hexanediol may be esterified with adipic acid alone or a mixture of adipic acid and phthalic anhydride or adipic acid and 2-ethylhexanoic acid to which acetic, butyric, or benzoic acid may be added to end the chain. By using such mixtures, novel plasticizers are obtained which impart greatly improved properties to the cellulose ester or ether composition. The compatibility of the plasticizer is enhanced, its heat resistance increased, its air and water exudation considerably decreased, and in some instances, substantially eliminated.

The following examples will serve to illustrate the process utilized in the preparation of the dicarboxylic acid polyesters of 1,4-butanediol and 1,6-hexanediol. All parts given are by weight unless otherwise specified.

EXAMPLE I

*Diglycolic acid polyester of 1,6-hexanediol*

161 parts of diglycolic acid, 165 parts of 1,6-hexanediol, and 1 part of p-toluenesulfonic acid (monohydrate) were charged into a 1-liter, 3-necked flask equipped with a stirrer, thermometer, take-off condenser and inlet for dry, oxygen-free nitrogen. After purging with nitrogen, the reaction mixture was heated at 130–140° C. The water as it was produced was removed by distillation. When most of the theoretical amount of water had been removed, 20 parts of Nuchar decolorizing charcoal were added and the heating continued for a total of 2½ hours, cooled, and diluted with 300 parts of acetone. The decolorizing charcoal was removed by filtration using suction and the acetone removed under reduced pressure. The residue was then heated in vacuo (nitrogen atmosphere) at 150–214° C. at 0.8 mm. for 1¼ hours. The residue was an orange, viscous liquid which was filtered while hot through a coarse, sintered-glass funnel to remove a small amount of the solid. The yield of the polyester was 88.5%.

EXAMPLE II

*Oxydibutyric acid polyester of 1,6-hexanediol*

190 parts of γ,γ'-oxydibutyric acid, 142 parts of 1,6-hexanediol, and 1 part of p-toluenesulfonic acid (monohydrate) were charged into a 1-liter, 3-necked flask as in Example I. After purging with nitrogen, the reaction mixture was heated at 140–150° C. and the water removed by distillation as it was formed. When essentially all of the water had been removed, 20 parts of Nuchar decolorizing charcoal were added and the heating continued for a total of 3 hours. After cooling, the reaction mixture was diluted with 300 parts of acetone and the Nuchar removed by filtration using suction. The acetone was removed under reduced pressure and the residue heated in vacuo (nitrogen atmosphere) at 160–225° C. at 1 mm. pressure for 1¼ hours. The residue was cooled to 100° C. and filtered through a coarse, sintered-glass funnel removing some of the gelatinous solid which formed. The filtrate was an orange, viscous liquid and weighed 255 grams indicating a yield of 94%.

EXAMPLE III

*Azelaic acid polyester of 1,4-butanediol*

188 parts of azelaic acid and 112 parts of 1,4-butanediol were charged into a reactor equipped with a thermometer, nitrogen inlet, sealed stirrer, and a short Vigreaux distilling head connected to a take-off condenser. After purging with nitrogen, the reaction mixture was heated at 150–200° C. for a total of 8 hours. The water was removed by distillation as it was formed. After heating for 3½ hours, the reaction mixture was cooled somewhat, and 20 parts of Nuchar decolorizing charcoal were added, after which heating and stirring were continued. The reaction mixture was cooled after heating was completed, and 150 parts of acetone were added as a solvent. The Nuchar was removed by filtration using suction and the acetone was removed from the filtrate under reduced pressure. The residue was then heated to vacuo (nitrogen atmosphere) at 150–250° C. at 0.8 mm. pressure for 1 hour. The residue was a yellow-orange, viscous liquid which was filtered while hot through a coarse, sintered-glass funnel to remove a small amount of solid. The final product solidified on cooling to a white pasty solid having a melting point of 31–34° C. The yield was 238 grams or 99% of the polyester.

EXAMPLE IV

*1,4-butanediol polyester of a mixture of adipic and mixed fatty acids*

110 parts of adipic acid, 87 parts of a commercially mixed fatty acid sold under the brand name of "Neo-Fat 15" containing 90% of capric acid, 7% of lauric acid, and 3% of caprylic acid, and 180 parts of 1,4-butanediol were charged into a reactor equipped as in Example I. The reaction mixture was heated at 150–200° C. for 1½ hours at 200–220° C. for an additional 5½ hours. The water was removed by distillation as it was formed. The product was transferred to a still pot equipped with a capillary inlet for dry, oxygen-free nitrogen, and heated in vacuo at 220–225° C. and 0.3 and 0.5 mm. of mercury for 1 hour to remove the excess 1,4-butanediol. After cooling, the residue was divided into two equal parts. The first part was further heated in vacuo under nitrogen at 207–240° C. and 0.3 and 0.5 mm. of mercury for 1 hour. The product obtained was a white solid having a melting point of 30–33° C. The second part was charged into a 300 ml., 3-necked flask equipped as above and 26 grams of acetic anhydride added. The mixture was stirred for ½ hour at room temperature and then heated at 105–217° C. for ½ hour. The excess acetic acid and acetic anhydride were removed by distillation. The product was heated in vacuo under nitrogen for 1 hour at 214–240° C. and 0.9 and 1.2 mm. of mercury. The final product was a yellow-orange liquid.

EXAMPLE V

*1,4-butanediol polyester of a mixture of adipic and sebacic acids*

88 parts of adipic acid, 121 parts of sebacic acid, 135 parts of 1,4-butanediol, and 1 part of p-toluenesulfonic acid (monohydrate) were charged into a 500 ml., 3-necked flask equipped as in Example I. The reaction mixture was heated under a nitrogen atmosphere at 130–145° C. for 2 hours and the water removed by distillation as it formed. Approximately midway in the heating, the reaction mixture was cooled somewhat and 20 parts of Nuchar decolorizing charcoal added. When the heating was completed, the reaction mixture was cooled and diluted with 250 parts of acetone. The Nuchar was removed by filtration and the acetone removed from the filtrate by distillation under reduced pressure. The residue was heated in vacuo at 150–165° C. at 0.8 mm. of mercury for 1 hour, cooled to 135° C., and filtered through a coarse, sintered-glass funnel. The filtrate obtained was a yellow-orange viscous liquid which solidified on cooling to a pasty white solid having a melting point of 35–37° C. The yield was 268 grams or 98% of the polyester.

EXAMPLE VI

*1,4-butanediol polyester of a mixture of adipic and suberic acids*

36.5 parts of adipic acid, 43.5 parts of suberic acid, 56 parts of 1,4-butanediol, and 0.5 part of p-toluenesulfonic acid (monohydrate) were charged into a 300 ml., 3-necked flask equipped as in Example I. The flask was purged with nitrogen and the reaction mixture heated at 120–140° C. for 2 hours, the water being removed by distillation as it was formed. The reaction mixture was then heated in vacuo (nitrogen atmosphere) at 150° C. at 1 mm. of mercury pressure for 1 hour. The polyester was obtained in good yield as a gray pasty solid having a melting point of 35–37 C.

EXAMPLE VII

*1,4-butanediol and 1,6-hexanediol polyesters of mixed acids*

Polyesters of 1,4-butanediol and equal parts of adipic and succinic acids, polyesters of 1,4-butanediol and equal parts of sebacic acid and 2-ethylhexanoic acids, polyesters of 1,6-hexanediol and adipic acid, polyesters of 1,6-hexanediol and $\gamma,\gamma'$-oxydibutyric acid, polyesters of 1,4-butanediol and 4 parts of azelaic acid to 1 part of 2-ethylhexanoic acid, polyester of 1,4-butanediol and equal parts of sebacic acid and phthalic anhydride were prepared in the manner described in the foregoing working examples.

The polyesters prepared as above range in properties from undistillable liquids to waxy solids. The various properties are shown in Table 1.

cellulose ester or ether composition and the properties desired of the cellulose ester. The most efficacious amount to be employed for any particular composition can be very readily determined by simple routine spot experiments. In general, however, the amount of plasticizer to add for molding powders may range from 20 to 40% of the powder, in solutions for films anywhere from 5 to 30%, in lacquers about 5 to 50%, in dopes from 10 to 100%, and in laminating solutions from 10 to 30%. All of these percentages are based on the weight of the cellulose ester or ether.

The following examples illustrate the application of the foregoing esters as plasticizers and the improved results obtained thereby when compared with currently used plasticizers.

EXAMPLE VIII

A film of cellulose acetate of 5 mil thickness, containing 58.4 to 59% combined acetic acid, was prepared by casting the composition given below containing various commercial plasticizers on a clean, glass plate with a doctor blade, followed by air drying for 48 hours at room tem-

TABLE 1.—PROPERTIES OF VARIOUS POLYESTERS OF 1,4-BUTANEDIOL AND 1,6-HEXANEDIOL

| Acids Used | Molecular Weight | State | Melting Point, °C. | Boiling Point, °C. |
|---|---|---|---|---|
| 1,4-Butanediol Polyesters: | | | | |
| *Single Acids—* | | | | |
| $\gamma,\gamma'$-oxydibutyric | 700 | Liquid | | Not distillable. |
| Azelaic | 700 | Pasty liquid | 30–32 | Do. |
| Phthalic | 1,200 | Liquid | | |
| Adipic | 1,300 | Waxy solid | 34–42 | |
| Suberic | 1,300 | ----do---- | 49.5–52 | |
| Sebacic | 2,000 | ----do---- | 66–67 | |
| Adipic | 3,800 | ----do---- | 50–58 | |
| *Mixed Acids—* | | | | |
| 1-Sebacic / 1-Phthalic | 500 | Liquid | | Do. |
| 1-Adipic / 2-Ethylhexanoic | 600 | ----do---- | | Do. |
| 4-Azelaic / 2-Ethylhexanoic | 600 | ----do---- | | Do. |
| 1-Adipic / 1-Succinic | 1,400 | Waxy solid | 61–62.5 | |
| 1-Adipic / 1-Diglycolic | 1,500 | Liquid | | Do. |
| 1-Adipic / 1-Phthalic | 1,900 | ----do---- | | Do. |
| 1,6-Hexanediol Polyesters: | | | | |
| *Single Acids—* | | | | |
| $\gamma,\gamma'$-Oxydibutyric | 500 | ----do---- | | Do. |
| Phthalic | 500 | ----do---- | | Do. |
| Suberic | 500 | Pasty solid | 30–33 | |
| Adipic | 900 | ----do---- | 45–46 | |
| Diglycolic | 1,100 | ----do---- | 34–36 | |
| $\gamma,\gamma'$-Oxydibutyric | 1,400 | Liquid | | Do. |
| Adipic | 1,600 | Waxy solid | 47–49 | |
| Suberic | 1,800 | ----do---- | 50–54 | |
| *Mixed Acids—* | | | | |
| 1-Adipic / 1-Phthalic | 500 | Liquid | | Do. |
| 1-Sebacic / 1-Phthalic | 900 | Pasty liquid | 33–35 | |
| 1-Adipic / 1-Sebacic | 2,000 | Waxy solid | 46–48 | |

NOTE:
(1) Molecular weight determined by the ebulliometric boiling point rise in acetone using a micro-adaption of the Menzie-Wright apparatus.
(2) Melting points were determined by the capillary tube method.
(3) The numerals before the mixed acids represent the mole ratio of acids used to form the polyester The esters prepared above are readily compatible with the cellulose esters and ethers commercially used, such as cellulose acetate, cellulose triacetate, cellulose acetate-propionate, cellulose acetate-butyrate, cellulose nitrate, cellulose nitrate-acetate, ethyl cellulose, benzyl cellulose, and the like. The esters may be incorporated into molding powders of cellulose esters and ethers or into solutions which are normally prepared for films, lacquers, dopes, and laminating solutions. The concentration or amount to be used as a plasticizer will depend on the type of perature at a controlled rate to prevent blushing of or other physical damage to the film. The film was then removed from the glass plate and further dried for 2 hours at 60° C. in the presence of freely circulating air.

|  | Parts |
|---|---|
| Cellulose acetate | 15 |
| Plasticizer | 3 |
| Methylene chloride | 50 |
| Ethylene chloride | 22 |
| Absolute ethanol | 10 |

In like manner, films of the same thickness were prepared in which the plasticizers prepared as described above were substituted for the various commercial plasticizers in the above composition. These films had excellent flexibility, toughness, and clarity.

Samples of all of the films were placed in an air circulating oven for 24 hours at 100° C. In another instance, samples were completely immersed in water at room temperature for 48 hours, removed, rinsed with distilled water, and dried for 2 hours at 60° C. The superiority of films containing the plasticizers of this invention over similar films containing various commercial plasticizers in resistance to loss of weight under this treatment is shown in Table 2.

TABLE 2

| Plasticizer | Percent Weight Loss of Film After 24 Hours at 100° C. | Percent Weight Loss of Film After 48 Hours in Water at Room Temperature |
|---|---|---|
| Triacetin | 6.1 | 10.2 |
| Dibutyl tartrate | 7.0 | 9.6 |
| Dimethyl phthalate | 5.0 | 9.6 |
| Methyl phthalyl ethyl glycolate | 5.5 | 6.1 |
| Methoxyethyl oleate | 6.6 | ² 3.0 |
| Butyl cellosolve stearate ¹ | 8.6 | ² 5.5 |
| Bis-methoxyethyl adipate | 9.4 | 15.8 |
| Polyester of 1,4-butanediol and equal parts of adipic and sebacic acids (M. W.—1,100) | 0.4 | 1.3 |
| Polyester of 1,4-butanediol and equal parts of sebacic and 2-ethylhexanoic acids (M. W.—700) | 0.8 | 1.9 |
| Polyester of 1,4-butanediol and equal parts of adipic and azelaic acids (M. W.—600) | 0.7 | 3.9 |
| Polyester of 1,4-butanediol and 4 parts of azelaic acid to 1 part of 2-ethylhexanoic acid (M. W.—600) | 1.0 | 4.0 |
| Polyester of 1,4-butanediol and adipic acid (M. W.—1,300) | 2.1 | 2.7 |
| Polyester of 1,4-butanediol and adipic acid (M. W.—2,300) | 2.3 | 2.1 |
| Polyester of 1,4-butanediol and γ,γ'-oxydibutyric acid (M. W.—700) | 1.3 | 5.1 |
| Polyester of 1,4-butanediol and azelaic acid (M. W.—700) | 2.1 | 2.4 |
| Polyester of 1,6-hexanediol and adipic acid (M. W.—900) | 1.9 | 3.3 |
| Polyester of 1,6-hexanediol and diglycolic acid (M. W.—1,100) | 4.1 | 5.3 |

¹ Plasticizer not completely compatible.
² Film becomes opaque; plasticizer exudes.

EXAMPLE IX

A film of cellulose acetate-butyrate of 5 mil thickness having an average acetyl content of 30% and butyryl content of 17.5% was prepared by casting the composition given below, containing various commercial plasticizers, on a clean, glass plate with a doctor blade, followed by air drying for 48 hours at room temperature at a controlled rate to prevent blushing of the film. The film was then removed from the glass plate and further dried for 2 hours at 60° C. in the presence of freely circulating air.

| | Parts |
|---|---|
| Cellulose acetate-butyrate | 15 |
| Plasticizer | 3 |
| Methylene chloride | 50 |
| Ethylene chloride | 22 |
| Absolute ethanol | 10 |

In like manner, films of the same thickness were prepared in which the plasticizers prepared as described above were substituted for the various commercial plasticizers in the given composition. Films of excellent flexibility, toughness, and clarity were produced.

Samples of all these films were exposed to freely circulating air in an oven for 24 hours at 100° C. and to the leaching action of water for 48 hours at room temperature. The superiority of films containing the plasticizers of this invention over those containing various commercial plasticizers in resistance to weight loss under these conditions is shown in Table 3.

TABLE 3

| Plasticizer | Percent Weight Loss of Film After 24 Hours at 100° C. | Percent Weight Loss of Film After 48 Hours in Water at Room Temperature |
|---|---|---|
| Dimethyl phthalate | 7.9 | 2.7 |
| Methyl phthalyl ethyl glycolate | 7.2 | 1.8 |
| Triacetin | 9.7 | 3.6 |
| Dibutyl tartrate | 9.8 | 3.8 |
| Methoxyethyl oleate | 9.9 | 0.4 |
| Butyl cellosolve stearate ¹ | 8.1 | 0.5 |
| Bis-methoxyethyl adipate | 14.5 | 14.4 |
| Bis-methoxyethyl phthalate | 7.1 | 2.1 |
| Bis-butoxyethyl phthalate | 7.5 | 0.8 |
| Polyester of 1,4-butanediol and adipic acid (M. W.—1,300) | 0.5 | 0.7 |
| Polyester of 1,4-butanediol and azelaic acid (M. W.—1,100) | 0.4 | 0.6 |
| Polyester of 1,4-butanediol and diglycolic acid (M. W.—1,200) | 1.3 | 1.3 |
| Polyester of 1,4-butanediol and equal parts of adipic and succinic acids (M. W.—1,400) | 1.4 | 0.8 |
| Polyester of 1,4-butanediol and 3 parts of adipic acid and 1 part of sebacic acid (M. W.—1,300) | 0.6 | 0.3 |
| Polyester of 1,4-butanediol and equal parts of sebacic and 2-ethylhexanoic acids (M. W.—700) | 1.3 | 0.7 |
| Polyester of 1,6-hexanediol and adipic acid (M. W.—900) | 0.7 | 1.3 |
| Polyester of 1,6-hexanediol and azelaic acid (M. W.—1,000) | 0.8 | 0.9 |
| Polyester of 1,6-hexanediol and γ,γ'-oxydibutyric acid (M. W.—1,300) | 0.4 | 0.9 |
| Polyester of 1,4-butanediol and suberic acid (M. W.—1,300) | 0.4 | 0.5 |
| Polyester of 1,6-hexanediol and suberic acid (M. W.—500) | 1.0 | 0.9 |
| Polyester of 1,4-butanediol and equal parts of suberic and adipic acids (M. W.—1,400) | 0.5 | 0.2 |
| Polyester of 1,4-butanediol and equal parts of suberic and sebacic acids (M. W.—1,300) | 0.5 | 0.4 |

¹ Not completely compatible.

EXAMPLE X

A film of cellulose acetate-butyrate of 5 mil thickness having an average acetyl content of 30% and butyryl content of 17.5% was prepared as given in Example IX from a composition consisting of the following:

| | Parts |
|---|---|
| Cellulose acetate-butyrate | 15 |
| Triphenyl phosphate | 3 |
| Methylene chloride | 50 |
| Ethylene chloride | 22 |
| Absolute ethanol | 10 |

Similar films were prepared in which the plasticizers of this invention were substituted for triphenyl phosphate.

Samples of all of these films were exposed to freely circulating air for 24 hours in an oven at 100° C. The superiority of films containing the plasticizers of this invention over triphenyl phosphate, a plasticizer commonly used by the trade, in resistance to loss of plasticizer under these conditions is shown in Table 4.

TABLE 4

| Plasticizer | Percent Weight Loss of Film After 24 Hours at 100° C. |
|---|---|
| Triphenyl phosphate | 5.2 |
| Polyester of 1,4-butanediol and adipic acid (M. W.—2,300) | 0.5 |
| Polyester of 1,4-butanediol and azelaic acid (M. W.—700) | 0.5 |
| Polyester of 1,4-butanediol and phthalic anhydride (M. W.—1,200) | 2.2 |
| Polyester of 1,4-butanediol and equal parts of adipic and sebacic acids (M. W.—1,100) | 0.5 |
| Polyester of 1,4-butanediol and 4 parts of azelaic acid to 1 part of 2-ethylhexanoic acid (M. W.—600) | 1.3 |
| Polyester of 1,4-butanediol and equal parts of sebacic acid and phthalic anhydride (M. W.—500) | 1.8 |
| Polyester of 1,6-hexanediol and adipic acid (M. W.—900) | 0.7 |
| Polyester of 1,6-hexanediol and γ,γ'-oxydibutyric acid (M. W.—1,300) | 0.4 |

We claim:

1. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of an acid selected from the class consisting of unsubstituted aliphatic dicarboxylic acids having 4 to 10 carbon atoms and unsubstituted isocyclic dicarboxylic acids having from 8 to 10 carbon atoms and mixtures thereof with a dihydroxyalkane selected from the class consisting of 1,4-butanediol and 1,6-hexanediol, said polyesters having a molecular weight ranging from 500 to 3000.

2. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of the class having the following general formulae:

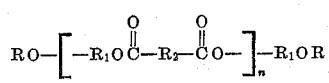

and

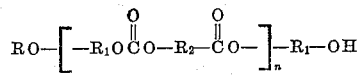

wherein R represents a member selected from the class consisting of hydrogen and acyl groups of from 2 to 8 carbon atoms, $R_1$ represents a methylene chain of from 4 to 6 carbon atoms, $R_2$ represents a member selected from the class consisting of unsubstituted aliphatic groups having from 4 to 10 carbon atoms and unsubstituted isocyclic groups having from 8 to 10 carbon atoms, and $n$ represents an integer of from 2 to 20, said polyesters having a molecular weight ranging from 500 to 3000.

3. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of 1,6-hexanediol and diglycolic acid, having a molecular weight ranging from 500 to 1600.

4. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of 1,6-hexanediol and γ,γ'-oxydibutyric acid, having a molecular weight ranging from 500 to 1600.

5. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of 1,4-butanediol and azelaic acid, having a molecular weight ranging from 500 to 1600.

6. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of 1,6-hexanediol and adipic acid, having a molecular weight ranging from 500 to 1600.

7. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of 1,4-butanediol and adipic acid, having a molecular weight ranging from 500 to 1600.

8. A composition of matter comprising an organic cellulose derivative selected from the class consisting of water-insoluble cellulose esters of nitric acid, lower alkyl monocarboxylic acids, and mixed esters thereof, and water-insoluble cellulose ethers of benzyl alcohol and of lower alkyl monohydric alcohols containing, in a plasticizing amount, a polyester of 1,4-butanediol and a mixture of adipic and 2-ethylhexanoic acids having a molecular weight of 600.

References Cited in the file of this patent

UNITED STATES PATENTS

| Number | Name | Date |
|---|---|---|
| 598,648 | Schupphaus | Feb. 8, 1898 |
| 1,901,130 | Smith | Mar. 14, 1933 |
| 2,129,156 | Trolander et al. | Sept. 6, 1938 |
| 2,578,684 | Filachione | Dec. 18, 1951 |

FOREIGN PATENTS

| Number | Country | Date |
|---|---|---|
| 144,030 | Austria | Dec. 27, 1935 |